May 12, 1931.  G. M. AGEE  1,804,386
FEED MIXER
Filed July 11, 1929   2 Sheets-Sheet 2
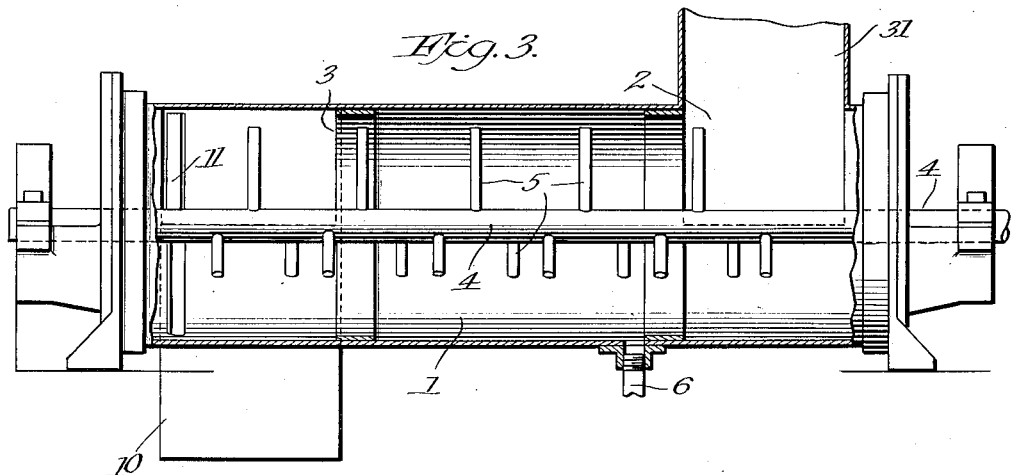
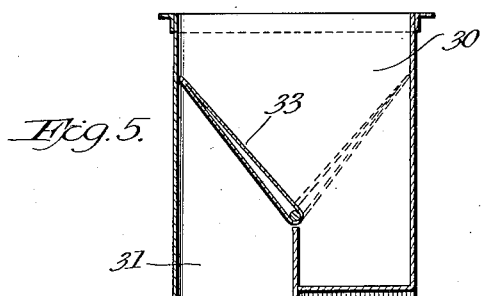
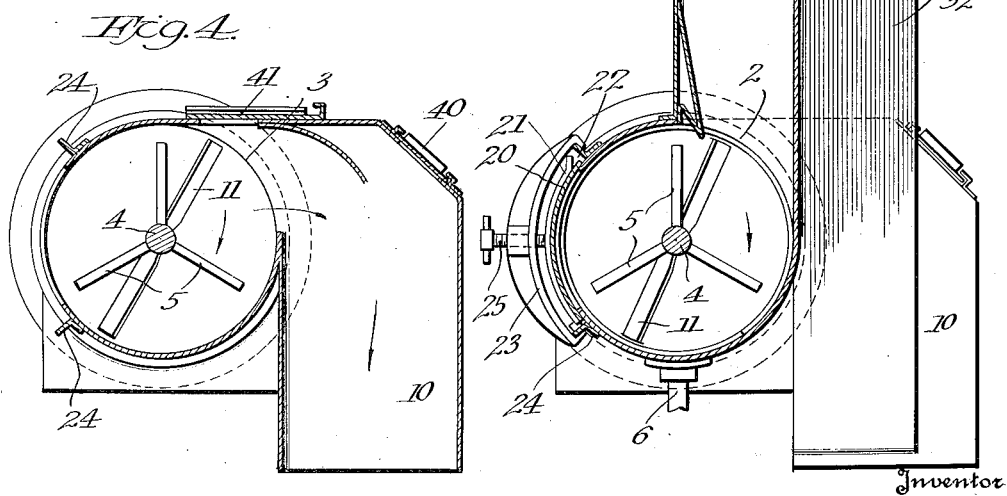
Inventor
George M. Agee Patented May 12, 1931

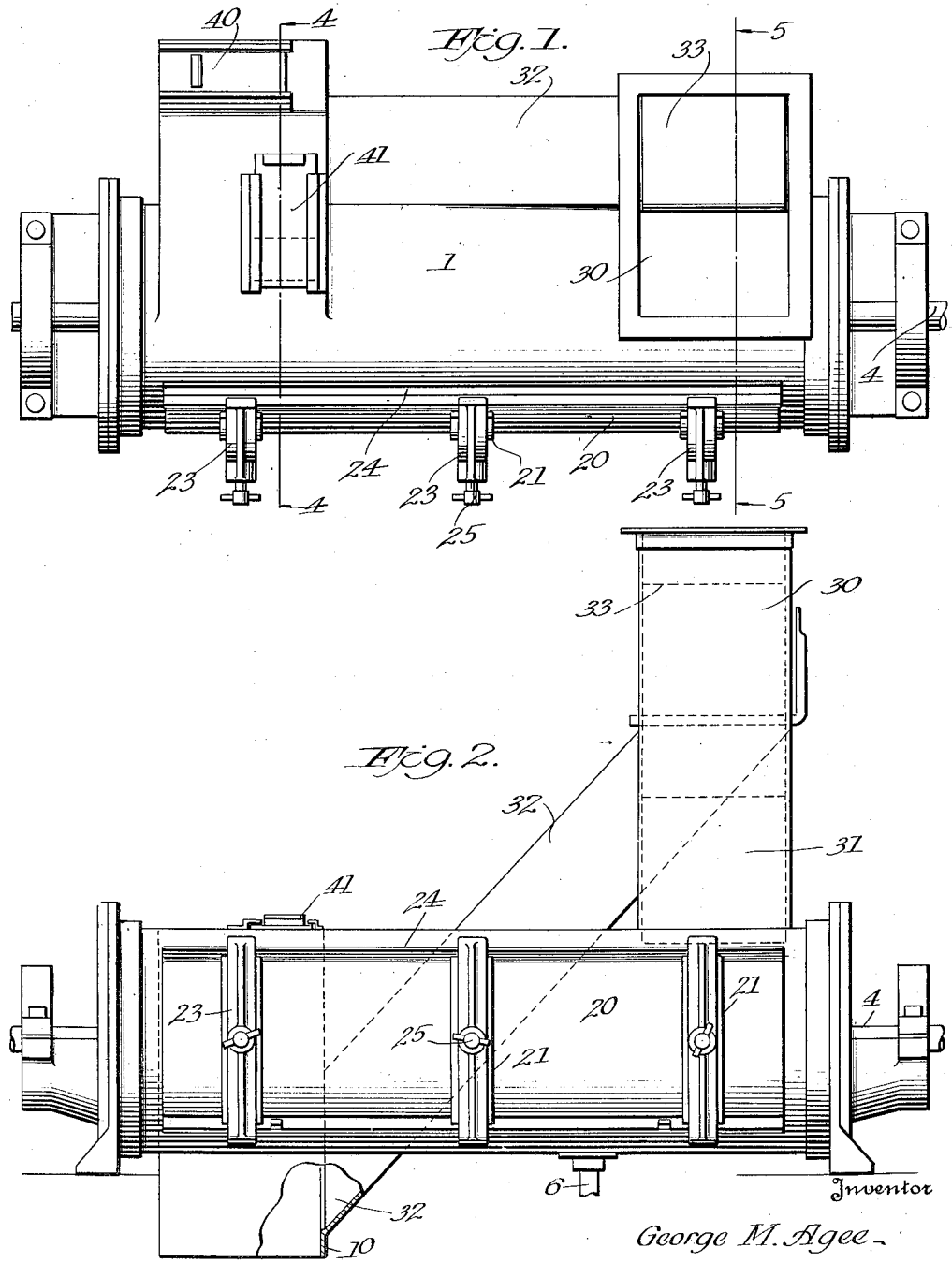

1,804,386

UNITED STATES PATENT OFFICE

GEORGE M. AGEE, OF DES MOINES, IOWA

FEED MIXER

Application filed July 11, 1929. Serial No. 377,466.

The present invention relates to improvements in apparatus for preparing a sweetened feed for live stock. The subject matter of the application is an improvement upon apparatus of an earlier application for carrying out a method invented by me and also forming the subject matter of a prior application for patent.

By such method and the apparatus hereinafter described I am enabled to provide a very superior sweet or "molasses feed" for live stock which will be free from objectionable features that have been incident to feeds of this character produced by other methods.

The advantages of a sweetened feed for live stock are well known and feeds of this character are becoming very popular with raisers of stock. By the methods commonly employed prior to my invention it was customary to add heated molasses to the grain content of the feed and this has necessitated the employment of rather complicated and somewhat expensive apparatus.

By my improved method the molasses is supplied in unheated condition, the temperature of the grain content and molasses being uniformly raised during the mixing operation, so that a very intimate mixture of the grain and molasses is effected.

An important feature of the invention of the present application is to provide a simple and relatively inexpensive apparatus for carrying out my improved method before referred to.

In the accompanying drawings,

Figure 1 is a plan of an apparatus embodying the present invention.

Figure 2 is the side elevation.

Figure 3 is a view with the mixing receptacle in partial section.

Figure 4 is a transverse section substantially on the line 4—4 of Figure 1.

Figure 5 is a similar view substantially on the line 5—5 of Figure 1.

Referring to the drawings in the several views of which like parts are designated by the same reference character, the apparatus includes a mixing drum or elongated receptacle preferably of substantially cylindrical form in cross section, mounted on a suitable frame in a substantially horizontal position.

The cylinder is provided adjacent its opposite ends with a grain inlet 2 and an outlet 3 for the mixed product, both said openings being preferably arranged, as shown, above the horizontal plane of the longitudinal axis of the receptacle. The apparatus also includes an agitating means comprising a shaft 4 extending through the ends of the receptacle 1 and mounted in suitable bearings and a series of agitating arms 5 secured to and extending radially outward from said shaft within the receptacle. The agitating arms 5 are so related to the axis of the shaft 4 that they operate not only to thoroughly mix the grain and molasses supplied to the receptacle as hereinafter referred to, but also to move such mixture toward and through the outlet 3.

Any suitable power means, not shown, is provided for rotating the agitator shaft 4 at the desired speed.

The molasses is supplied to the receptacle under pressure through a pipe 6 communicating with an inlet in the bottom of the receptacle and as previously referred to such molasses is supplied to the receptacle at normal temperatures or in an unheated condition.

As shown particularly in Figure 3 of the drawings, the molasses inlet is located at the left of vertical planes including the grain inlet 2 and this particular relation of the molasses supply to the grain inlet is a feature of considerable importance. Extensive practical experience with machines for carrying out my improved cold molasses process has shown that if the molasses inlet is in alignment with the grain inlet the particles of molasses are coated with fine dust prior to their becoming mixed with the grain and this dust-like coating acts to retard somewhat efficient mixing of the molasses and grain. By arranging the molasses and grain inlets in the particular relation shown this objection is avoided.

The molasses being supplied at normal temperatures there is no danger of it tending to carbonize or be changed so as not only to have a bitter taste but to render the mixed feed indigestible as frequently happens when the molasses is preheated.

The agitation of the grain and molasses within the receptacle 1 produces a certain amount of heat but this heat is distributed uniformly through the grain and molasses and while assisting in the mixing of such ingredients is not of a degree sufficient to effect the molasses sufficient to destroy the desired vitamin B or C elements thereof and therefore the process followed by using the apparatus of the present application preserves these very desirable qualities of the molasses.

As before referred to and as shown in the drawings the outlet 3 from the receptacle is formed in a side wall thereof and the mixed product is thrown out as it were through such aperture by the action of the beater arms 5 in alignment therewith into a discharge spout 10.

In order that the mixture may be thus properly ejected from the receptacle and prevented from collecting on the adjacent end wall the shaft 4 is provided near said wall with a pair of radially projecting blades 11 which are arranged at such an angle to the shaft axis that they tend, as the shaft rotates, to move the mixture slightly longitudinally of the shaft toward the inlet aperture end. These blades effectually prevent the building up of a body of the mixture on the end wall of the receptacle which would tend to interfere with the rotation of the agitator.

As explained in an earlier application the first effect of mixing the molasses and grain is to provide a slight coating on the interior of the cylinder which has the form of a series of alternating circumferential ribs and grooves and the friction due to the movement of the ingredients over this roughened surface by the action of the agitators assists in slightly raising the temperature of the ingredients as explained.

At intervals it is necessary to clean the interior of the receptacle and for this purpose an aperture is provided in the side wall of the receptacle. This aperture which extends throughout the major portion of the length of the receptacle and for a considerable distance above and below the horizontal plane of the axis thereof is closed by a detachable closure plate 20 the edges of which overlap the wall of the receptacle both at the upper and lower edge of said aperture. As shown the plate 20 is provided with a plurality of transversely extending reinforcing members 21 the upper ends of which are deflected outward slightly to provide a space 22 in which may be inserted a suitable implement if it is necessary to force the plate away from the receptacle in removing it.

The closure plate is securely clamped against the receptacle by means shown as comprising a plurality of yokes 23, the ends of which engage ribs on the receptacle above and below the clean-out aperture and shown as formed by angle irons 24, a tightening screw 25 extending through each of said yokes and bearing against the plate 20.

By this arrangement it will be seen that I provide a simple but very effective means for securing the closure plate in position over the clean-out aperture when the apparatus is in use, but by loosening the screws 25 and removing the yokes 23 said plate can be detached and access can then be had to the entire interior of the drum to enable the same to be readily cleaned.

In the embodiment of the invention illustrated the grain element of the mixed feed to be produced is supplied from a feed chute 30 having a branch 31 which communicates with the grain inlet 2. The chute 30 is shown as provided with a bypass 32 which connects with the mixture discharge passage 10 and a pivotally mounted valve or gate 33 is provided for directing the flow of grain from the chute 30 into the receptacle feed branch 31 or to said bypass as may be desired. By this arrangement it will be seen that material from the chute 30 which may communicate with any suitable grinding mill can be directed either through the mixing receptacle or in case it should not be desired to mix the same with molasses can be delivered directly to the delivery chute 10.

By the term "grain" as herein employed it will be understood that I refer not only to such material as corn, oats, kaffir, feteria and so forth, but also to any other material which is commonly used as an ingredient of a sweetened live stock food, for example alfalfa, soy beans, hay, cotton seed meal, bran, etc., and the "molasses" may be the article commonly referred to by that term or any other suitable sweetened liquid.

It will also be understood that there can be modification of some of the details of the apparatus hereinbefore particularly described and shown in the accompanying drawings without departing from the invention. Unless specifically defined in the appended claims the invention is not intended to be understood as limited to the exact details shown.

What I claim is:

1. An apparatus for preparing feed for live stock comprising an elongated receptacle, of substantially cylindrical form in cross section and having a grain inlet and a mixture outlet, located respectively adjacent opposite ends, an aperture being provided in the side of the receptacle and extending throughout the major portion of the length thereof, a detachable closure plate positioned over said aperture, and adjustable means engaging the receptacle at opposite sides of the aperture and the plate between the edges of the aperture for holding said plate in position.

2. An apparatus for preparing feed for live stock comprising an elongated receptacle, of substantially cylindrical form in cross section and having a grain inlet and a mixture outlet, located respectively adjacent opposite ends, an aperture being provided in the side of the receptacle and extending throughout the major portion of the length thereof, a detachable closure plate positioned over said aperture, projections on the receptacle, at opposite sides of said side wall aperture, and means engaging said projections and the closure plate at points between said projections for securing the latter in position.

3. An apparatus for preparing feed for live stock comprising an elongated receptacle, of substantially cylindrical form in cross section and having a grain inlet and a mixture outlet, located respectively adjacent opposite ends, an aperture being provided in the side of the receptacle and extending throughout the major portion of the length thereof, a detachable closure plate positioned over said aperture, ribs extending longitudinally of the outside of the receptacle, respectively above and below said side wall aperture, and means engaging said ribs and bearing against the closure plate at a point between said ribs for securing the latter in position.

4. An apparatus for preparing feed for live stock comprising an elongated receptacle, of substantially cylindrical form in cross section and having a grain inlet and a mixture outlet, located respectively adjacent opposite ends, an aperture being provided in the side of the receptacle and extending throughout the major portion of the length thereof, a detachable closure plate positioned over said aperture, ribs extending longitudinally of the outside of the receptacle, respectively above and below said side wall aperture, a yoke extending across the closure plate and having its ends engaging said ribs and adjustable means carried by said yoke and bearing against the closure plate to retain it in position.

5. An apparatus for preparing feed for live stock comprising an elongated receptacle, of substantially cylindrical form in cross section and having a grain inlet and a mixture outlet, located respectively adjacent opposite ends, an aperture being provided in the side of the receptacle and extending throughout the major portion of the length thereof, a detachable closure plate positioned over said aperture, a plurality of yokes extending transversely across said plate, when positioned over the aperture, and engaged with the side wall of the receptacle, and a screw carried by each yoke and adapted to be adjusted to force the plate into close contact with the receptacle wall.

In testimony whereof I have hereunto set my hand.

GEORGE M. AGEE.